Patented Oct. 17, 1933

1,931,309

UNITED STATES PATENT OFFICE 1,931,309

COMPOSITE PRODUCT AND METHOD OF MAKING THE SAME

Owen A. Thompson, Cuyahoga Falls, Ohio, assignor to The B. F. Goodrich Company, New York, N. Y., a corporation of New York No Drawing. Application September 18, 1930
Serial No. 482,915

11 Claims. (Cl. 18—59)

This invention relates to the manufacture of rubber and particularly to the adhesion of rubber to other substances such as metals.

Heretofore various methods of obtaining a permanent adhesion of rubber to metal have been proposed, but most of these prior processes suffer from disadvantages which tend to prevent their universal adoption. Certain processes, while easy to carry out, give only mediocre degrees of adhesion. Others require complicated and expensive equipment, or the handling of dangerous, corrosive or toxic chemicals. Others give rise to adhesion which is satisfactory at room temperatures, but fails at elevated temperatures. It is therefore an object of this invention to produce a composite product in which rubber and metal are firmly and indissolubly united, and to provide an inexpensive and readily performed process for manufacturing the product. Other objects will be apparent from the following description of the invention.

This invention consists essentially in adhering rubber or other resilient, rubber-like substances to a rigid material such as metal by interposing between the rubber or like substance and the metal a layer of a composition comprising rubber intimately admixed with a substance which is not mutually soluble therewith, but is capable of adhering firmly to metals or other rigid bodies when pressed thereagainst or heated in contact therewith. The adhesive substance thereupon adheres to the rigid material, while the resilient rubber or rubber-like substance mixed therewith and held thereby adheres to the main body or rubber, forming a strongly adherent unitary structure. In one embodiment of the invention an intermediate layer of a composition comprising vulcanizable rubber mixed with a fusible synthetic resin which hardens upon heating is interposed between rubber and metal, whereupon the assemblage is heated under pressure to vulcanize the rubber and harden and render infusible the synthetic resin. It includes likewise the novel product obtained by the practice of the above process. The invention will be particularly described below with reference to a preferred embodiment.

A rubber composition is prepared containing rubber approximately 36 parts by weight, zinc oxide 53 parts, carbon black 8.6 parts, sulphur 2.2 parts, and methylene p-toluidine 0.2 parts or equivalent proportions of other organic accelerators. Of this composition 100 parts are mixed with 40 parts of a powdered, solid, but fusible, alcohol-soluble phenol-formaldehyde condensation product. The mixing process may be carried out in the ordinary manner by mastication on a roll mill, but the rolls should be well cooled in order to prevent a premature hardening of the synthetic resin. The mixture is then dissolved in 500 parts of hexalin acetate (cyclohexyl acetate) to form a liquid cement. If this cement shows an undue tendency to separate into two layers containing the rubber and the synthetic resin respectively, a rubber solvent such as benzol or gasoline may be added, in an amount up to about 200 parts.

The article which is to be coated with rubber, for example, a steel plate, is cleaned free of grease and scale, say by sandblasting. The article is then given a uniform coat of the cement described above, by brushing, dipping, spraying, or other equivalent means. If the cement shows a tendency toward separation of its constituents it should be kept well mixed before application but should not be unduly disturbed after application. It should be flowed on the surface like a varnish rather than brushed out like a paint. After the coating has dried, a layer of vulcanizable rubber, say a calendered sheet of the rubber composition described in the preceding paragraph, is applied, and the structure is vulcanized under pressure, in a heated mold or in a vulcanizer containing steam or hot water at a convenient pressure.

Rubber adhered to metal by the process described above cannot be torn loose from the metal, the strength of the adhesive bond greatly exceeding the strength of vulcanized rubber. Furthermore, the adhesive bond is not affected by changes in temperature, but continues to unite the rubber most tenaciously to the metal up to temperatures at which the rubber is destroyed. The process is not limited to adhesion to steel, but is operable to unite rubber to other materials generally, including iron and steel, copper, brass, aluminum, porcelain, glass, wood, etc.

Although the invention has been described above with relation to rubber, the invention is by no means limited thereto. Other resilient, rubber-like compositions in general may be adhered permanently and tenaciously to other materials by the method of this invention. For instance such other materials include shellac compositions plasticized with glycerine, phenol, etc., polymerized vinyl chloride compositions plasticized with mixed diaryl amines, aromatic nitro compounds, etc.; compositions of tanned, insoluble glue plasticized with glycerine, molasses, etc.; nitrocellulose or cellulose ester compositions plasticized with non-volatile esters; polymethylene-polysulphide plastics; and other resilient rubber-like compositions.

When rubber itself is employed it is preferably, but not necessarily, vulcanized. The invention is operable generally with vulcanizable rubber compositions ranging from the so-called "pure gum" compositions to very highly pigmented compositions, or compositions containing reclaim or other substitutes. For some purposes it is preferred that the rubber which is mixed with the synthetic resin contain an appreciable proportion of inert pigment, but no such limitation is present respecting the outer layer of rubber. If the article which is to be coated is of irregular shape, the rubber may even be applied by dipping in a vulcanizable rubber latex, either with or without the assistance of a coagulant.

The adhesive substance which is mixed with the rubber-like material is likewise subject to numerous variations in composition and properties. Commercial fusible synthetic resins may be employed, or the synthetic resins may be prepared especially for the purpose of this invention. For example, a satisfactory synthetic resin is made by heating 50 parts by weight of phenol, 50 parts of furfural, and 10 sodium carbonate for somewhat over 3 hours at 100° C. Similar resins may be made by heating phenol, cresol, xylenol, naphthol, etc. with formaldehyde, acetaldehyde, butyraldehyde, furfural, etc. either with or without condensing agents, hardening agents etc. Other types of fusible synthetic resins which are capable of hardening when heated to vulcanizing temperatures may likewise be employed. These include, in addition to the simple phenol-aldehyde resins, certain of the sulphur-phenol-aldehyde resins, phenol-hexamethylene tetramine resins, urea-aldehyde resins, cyclohexanone-aldehyde resins, glycerine-phthalic anhydride resins, etc.

It is even possible to employ substances which do not harden upon heating, but which may be caused to soften upon the application of heat or pressure or both so as to form a firm bond on rigid metallic or other surfaces. Such substances includes the soluble polymers of vinyl chloride (soluble in ethylene chloride); solid, fusible bituminous substances such as gilsonite; fossil resin-gums such as copal and kauri gums; certain permanently fusible synthetic resins such as the ester gum made by reacting rosin with glycerine; etc. The adhesion attained by employing these substances does not withstand elevated temperatures as satisfactorily as that obtained by the preferred process in which synthetic resins capable of hardening are employed, but is quite satisfactory for ordinary use. In any case the adhesive substance which is selected will be one which is mutually insoluble in the rubber or rubber-like substance, but is readily mixed therewith to form an intermediate, more or less heterogeneous bonding layer.

The rubber or rubber-like substance and the synthetic resin or its equivalent may be mixed in any proportion in which substantial proportions of each are present, but preferably in the proportion of from 20 to 50 parts of the resin to 100 parts rubber. They may be mixed in solid form as described above, or mixed in solution. For example, the rubber may be dissolved in four times its weight of benzol, the powdered synthetic resin stirred in, and the mixture thinned with hexalin acetate in an amount equal to about half the volume of the benzol. This cement is applied in the same manner as the cement described above. Alternatively the rubber-synthetic resin mixture prepared to solid form may be calendered in a thin sheet and interposed between the rubber and the metal in sheet form, being either applied directly to the metal before the rubber, or being plied up with the rubber coating to form a composite sheet which is applied to the metal as a unit. In this case the surface which is applied to the metal may if desired be moistened with a solvent for the resin, while the surface which is applied to the rubber is moistened with a rubber solvent. Still another modification consists in coating the metal with a solution of the synthetic resin in a volatile solvent such as alcohol or ethyl acetate, drying and coating with a rubber cement containing a common solvent such as hexalin acetate, and then applying the rubber.

The rubber-synthetic resin cement may be prepared with any sufficiently volatile solvent capable of dissolving both the rubber and the synthetic resins, mixed if desired with an ordinary rubber solvent as described above. This class of solvents includes primarily such esters as hexalin acetate, butyl propionate, butyl butyrate, and amyl butyrate, but includes also other types of solvents such as cyclohexanone or acetophenone. Even such less volatile solvents as nitrobenzene may be employed, being eliminated from the cement coating by gentle heating. Or such solvents as nitrobenzene, terpineol, or ethyl abietate may be added to the cement in small proportions to assure substantial homogeneity of the cement layer during the latter phases of the drying process, so that the rubber and the resin will be caused to separate finally from one another in very finely divided form.

A necessary feature of the invention appears to be an intimate mechanical intermingling of the two mutually insoluble components, the rubber and the synthetic resin, in the adhesive layer, the rubber layer adhering to the rubber component and the metal or other material adhering to the synthetic resin component. This result is apparently produced by any of the hereinabove described modifications of this invention. However, it is to be understood that this theory, as well as any others which may be advanced herein, are given solely for purposes of illustration and explanation and are not to be construed as limitations of the scope of the invention.

While I have herein disclosed with considerable particularity certain preferred manners of performing my invention, I do not thereby desire or intend to limit myself solely thereto, for, as hitherto stated, the procedure may be modified, the precise proportions of the materials utilized may be varied and other materials having equivalent properties may be employed if desired without departing from the spirit and scope of the invention as defined in the appended claims.

I claim:

1. The process of adhering rubber to a rigid material which comprises interposing between the rubber and the other material a layer of a composition comprising vulcanizable rubber intimately intermingled with a fusible synthetic resin capable of hardening and becoming infusible when heated, and heating the assemblage.

2. The process of adhering rubber to another material which comprises interposing between the rubber and the other material a layer of a composition comprising vulcanizable rubber and a fusible synthetic resin capable of hardening and becoming infusible when heated, and subjecting the assemblage to heat and pressure.

3. The process of adhering rubber to another material which comprises interposing between the rubber and the other product a layer of a composition comprising vulcanizable rubber and a fusible phenol-aldehyde condensation product, and subjecting the assemblage to heat and pressure.

4. The process of adhering rubber to metal which comprises interposing between the rubber and the metal a layer of a composition comprising vulcanizable rubber and a fusible synthetic resin capable of hardening and becoming infusible when heated and subjecting the assemblage to heat and pressure.

5. The process of adhering rubber to metal which comprises interposing between the rubber and the metal a layer of a composition comprising vulcanizable rubber and a fusible phenol-aldehyde condensation product, and subjecting the assemblage to heat and pressure.

6. The process of adhering rubber to metal which comprises interposing between a layer of vulcanizable rubber and the metal a layer of a composition comprising vulcanizable rubber and a fusible phenol-aldehyde condensation product, and vulcanizing the assemblage under heat and pressure.

7. The process of adhering rubber to metal which comprises coating the metal with a solution containing vulcanizable rubber and a fusible phenol-aldehyde condensation product, evaporating the solvent, applying a layer of vulcanizable rubber, and vulcanizing the assemblage under heat and pressure.

8. The process of adhering rubber to metal which comprises coating the metal with a solution of a vulcanizable rubber composition and a fusible phenol-aldehyde condensation product in a solvent comprising a moderately volatile ester, evaporating the solvent, applying a layer of vulcanizable rubber, and vulcanizing the assemblage under heat and pressure.

9. A composite product comprising rubber adhered to another material through the intermediary of a layer of a composition comprising rubber and an infusible synthetic resin intimately intermingled with one another.

10. A composite product comprising a layer of vulcanized rubber, a layer of metal, and an intermediate bonding layer of a composition comprising vulcanized rubber and an infusible synthetic resin intimately intermingled with one another.

11. A composite product comprising a layer of vulcanized rubber, a layer of metal and an intermediate bonding layer of a composition comprising an infusible phenol-aldehyde condensation product intimately intermingled with vulcanized rubber.

OWEN A. THOMPSON.